(12) United States Patent
Geyzel

(10) Patent No.: US 9,111,340 B2
(45) Date of Patent: Aug. 18, 2015

(54) FREQUENCY-MODULATED WATERMARKING

(75) Inventor: Zeev Geyzel, Tekoa (IL)

(73) Assignee: Cisco Technology Inc., San Jose, CA (US)

(*) Notice: Subject to any disclaimer, the term of this patent is extended or adjusted under 35 U.S.C. 154(b) by 176 days.

(21) Appl. No.: 13/977,782

(22) PCT Filed: Nov. 29, 2011

(86) PCT No.: PCT/IB2011/055356
§ 371 (c)(1),
(2), (4) Date: Jul. 15, 2013

(87) PCT Pub. No.: WO2012/164361
PCT Pub. Date: Dec. 6, 2012

(65) Prior Publication Data
US 2013/0287369 A1 Oct. 31, 2013

Related U.S. Application Data

(60) Provisional application No. 61/519,713, filed on May 27, 2011.

(51) Int. Cl.
*G06T 1/00* (2006.01)
(52) U.S. Cl.
CPC ............. *G06T 1/0021* (2013.01); *G06T 1/0028* (2013.01); *G06T 2201/0051* (2013.01)
(58) Field of Classification Search
None
See application file for complete search history.

(56) References Cited

U.S. PATENT DOCUMENTS

| 5,949,055 A | 9/1999 | Fleet et al. |
| 6,873,711 B1 | 3/2005 | Murakami et al. |
| 6,879,701 B1 | 4/2005 | Rhoads |
| 2002/0170996 A1* | 11/2002 | Fukugawa et al. .......... 242/160.4 |
| 2003/0197878 A1 | 10/2003 | Metois et al. |
| 2005/0259820 A1 | 11/2005 | Jones |
| 2006/0239503 A1* | 10/2006 | Petrovic et al. ............... 382/100 |
| 2007/0108287 A1* | 5/2007 | Davis et al. .............. 235/462.01 |
| 2011/0007935 A1* | 1/2011 | Reed et al. ..................... 382/100 |
| 2011/0274406 A1* | 11/2011 | Kashiwagi et al. ........... 386/224 |

FOREIGN PATENT DOCUMENTS

| EP | 2 028 616 A1 | 2/2009 |
| WO | WO 99/60791 | 11/1999 |
| WO | WO 02/23481 A1 | 3/2002 |

OTHER PUBLICATIONS

May 21, 2012 Transmission of International Search Report and Written Opinion of ISA for captioned application.
S.A.M. Gilani et al., "Color Image-Adaptive Watermarking" *Digital Signal Processing 2002*, vol. 2 pp. 721-724 (IEEE 2002).

* cited by examiner

*Primary Examiner* — Hung Dang
*Assistant Examiner* — Sunghyoun Park
(74) *Attorney, Agent, or Firm* — Hahn Loeser & Parks LLP

(57) ABSTRACT

A method for image processing includes storing a data string and applying a background modulation to an image. The modulation includes a periodic spatial pattern of chromatic variations over an area of the image with a constant luminance over the area and with a spatial frequency of the chromatic variations that encodes the data string. Related apparatus and methods are included.

8 Claims, 4 Drawing Sheets

FREQUENCY-MODULATED WATERMARKING

RELATED APPLICATION INFORMATION

The present application is a 35 USC §371 application of PCT/IB2011/055356, filed on 29 Nov. 2011 and entitled "FREQUENCY MODULATED WATERMARKING", which was published on 6 Dec. 2012 in the English language with International Publication Number WO 2012/164361 and which relies for priority on U.S. Provisional Patent Application Ser. No. 61/519,713 of Zeev Geyzel filed 27 May 2011.

FIELD OF THE INVENTION

The present invention relates generally to systems and methods for processing images, and specifically to encoding information into electronic images.

BACKGROUND OF THE INVENTION

Video content transmitted over communication networks is generally subject to copyright. The copyright imposes strict legal limits on the ways in which subscribers are allowed to use the content that they receive from the network. For example, in addition to viewing video programs while they are broadcast, subscribers may be allowed to record the programs for their own use, but they are typically not permitted to distribute recorded copies of the programs. Notwithstanding these legal limitations, however, unauthorized copying and distribution of video content remains a major problem.

SUMMARY

Embodiments of the present invention that are described hereinbelow provide methods and systems for encoding information into electronic images. These methods and systems may be used, inter alia, in identifying the source of copied media content.

There is therefore provided, in accordance with an embodiment of the present invention, a method for image processing, which includes storing a data string and applying a background modulation to an image. The modulation includes a periodic spatial pattern of chromatic variations over an area of the image with a constant luminance over the area and with a spatial frequency of the chromatic variations that encodes the data string.

In some embodiments, the chromatic variations have respective first and second spatial frequencies along first and second axes of the image, and the first and second spatial frequencies are used to encode respective first and second parts of the data string. The chromatic variations may be defined by first and second chrominance components, wherein the chromatic variations used in encoding the data string include first and second variations of the first chrominance component along the first and second axes of the image, with the respective first and second spatial frequencies; and third and fourth variations of the second chrominance component along the first and second axes of the image, with different, respective third and fourth frequencies. The third and fourth spatial frequencies may be used to encode respective third and fourth parts of the data string.

Additionally or alternatively, when the chromatic variations include respective first and second variations of the first and second chrominance components, with different, respective first and second spatial frequencies, the data string may be encoded by a ratio of the first and second spatial frequencies.

In disclosed embodiments, the method includes receiving in a video playback device encoded video content for playback. The encoded video content is decoded in the video playback device while applying the background modulation so as to output a series of video images containing the background modulation. The data string may include an identification code, which uniquely identifies the video playback device. Typically, applying the background modulation includes generating a background containing the periodic spatial pattern, and summing the background with the decoded video content.

There is additionally provided, in accordance with an embodiment of the present invention, a method for image processing, which includes receiving an image with a background modulation including a periodic spatial pattern of chromatic variations over an area of the image with a constant luminance over the area and with a spatial frequency of the chromatic variations that encodes a data string. A spatial frequency spectrum of the image is analyzed so as to extract the data string from the image.

Analyzing the spatial frequency spectrum may include computing a difference between the received image and a corresponding source image, and analyzing the difference to find the spatial frequency spectrum. Alternatively or additionally, receiving the image may include receiving a sequence of images including the periodic spatial pattern, wherein analyzing the spatial frequency spectrum includes summing the images, and analyzing a sum of the images to find the spatial frequency spectrum.

There is also provided, in accordance with an embodiment of the present invention, apparatus for image processing, including a memory, which is configured to store a data string. Processing circuitry is configured to apply a background modulation to an image. The modulation includes a periodic spatial pattern of chromatic variations over an area of the image with a constant luminance over the area and with a spatial frequency of the chromatic variations that encodes the data string.

There is further provided, in accordance with an embodiment of the present invention, apparatus for image processing, including a memory, which is coupled to receive an image with a background modulation including a periodic spatial pattern of chromatic variations over an area of the image with a constant luminance over the area and with a spatial frequency of the chromatic variations that encodes a data string. A processor is configured to analyze a spatial frequency spectrum of the image so as to extract the data string from the image.

There is moreover provided, in accordance with an embodiment of the present invention, a computer software product, including a computer-readable medium in which program instructions are stored, which instructions, when read by a computer, cause the computer to receive an image with a background modulation including a periodic spatial pattern of chromatic variations over an area of the image with a constant luminance over the area and with a spatial frequency of the chromatic variations that encodes a data string, and to analyze a spatial frequency spectrum of the image so as to extract the data string from the image.

The present invention will be more fully understood from the following detailed description of the embodiments thereof, taken together with the drawings in which:

DETAILED DESCRIPTION OF EMBODIMENTS

Figure 1:
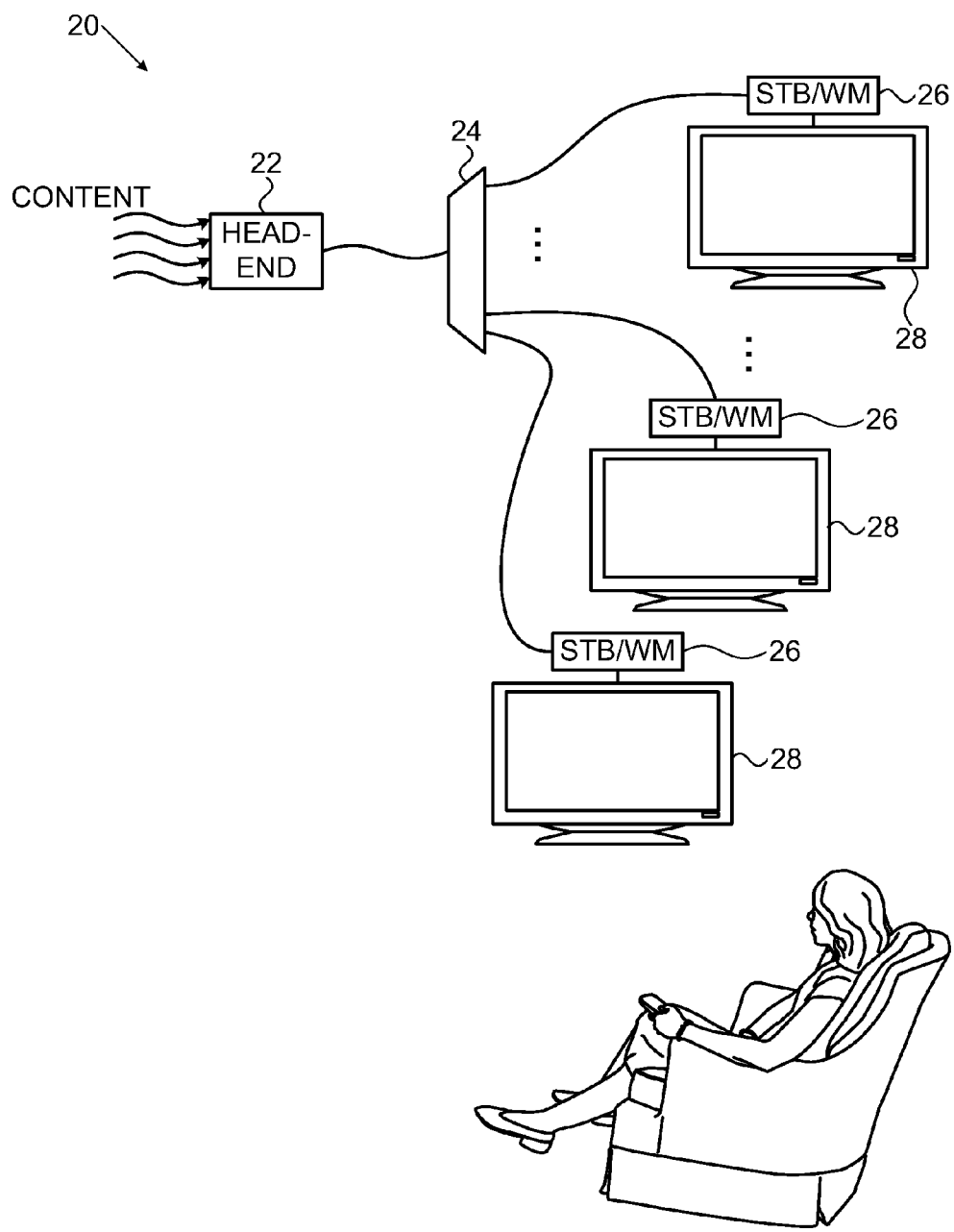
FIG. 1 is a schematic, pictorial illustration showing a video distribution system, in accordance with an embodiment of the present invention.

Unauthorized copies of video programs are widely distributed via the Internet and other media. Frequently a first-generation copy of an original, authorized presentation of the program (such as a television sports broadcast) is recorded by a subscriber, and the recorded copy is subsequently passed on and duplicated over and over, without authorization by the copyright owner. Although it is possible to locate and take action against distributors of these unauthorized copies, a more effective enforcement approach would be to attack the problem at its source, by finding the subscriber who made the first-generation copy.

Embodiments of the present invention that are described hereinbelow address this issue by applying a watermark to images as they are downloaded and/or played back and/or recorded by subscribers. In a disclosed embodiment, a unique watermark is applied by each subscriber's video playback device, typically (though not necessarily) in response to instructions transmitted from the head-end, prior to or together with the content that is to be watermarked. Alternatively or additionally, watermarks may be applied at the head end.

When an unauthorized copy of the content is discovered, the watermark may be extracted and used to identify the source of the copy. This identification enables the content owner to take appropriate punitive and/or deterrent action, such as initiating legal proceedings and/or terminating the subscriber's access rights.

In disclosed embodiments, image processing apparatus stores a data string, which is to be encoded in an image watermark. In the embodiments described below, the apparatus comprises a video display device and the data string comprises an identification code, which uniquely identifies the device; but the principles of the present invention may similarly be applied in other applications in which digital information is encoded in an image or an image sequence. The apparatus generates a background modulation and applies it to the image. The modulation comprises a periodic spatial pattern of chromatic variations over the area of the image, while the luminance of the background is held constant. The spatial frequency or frequencies of the modulation encode the data string.

The chromatic variations may be modulated in two dimensions, such as along the height and width axes of the image, with different spatial frequencies along the two axes. Furthermore, the chromatic variations may be defined in terms of two chrominance components, such as U and V chrominance coordinates, with their own, respective spatial frequencies. The two axes and two chrominance coordinates thus provide four different frequency values that may be used in encoding the value of the data string.

For this sort of watermarking scheme to be effective, it is desirable that the watermark be imperceptible even to a keen-eyed user viewing the content. For this reason, the chrominance modulation is typically applied at low amplitude and with relatively low spatial frequencies across the area of the image. The watermark can still be detected readily by applying spectral analysis, in the form of a spatial Fourier transform, for example, to the chrominance components of the image signal. The watermark can typically be detected in this manner in any single image that contains it, or it can be extracted (generally with enhanced signal/noise ratio) from the sum of multiple images in a video sequence.

FIG. 1 is a schematic, pictorial illustration showing a video distribution system 20, in accordance with an embodiment of the present invention. A head-end 22 transmits content via a distribution network 24 to multiple subscribers. The distribution network may comprise, for example, a cable entertainment network, a satellite network, a packet network (such as wired and/or wireless Internet), or any other suitable type of data communication network that is known in the art. Head-end 22 transmits the content to each subscriber in the form of encoded video, such as a stream encoded in accordance with H.264 or any other applicable digital standard, or possibly as a modulated analog video signal (which is also considered to be "encoded" in the present context).

Each subscriber receives the encoded content in a video playback device 26 with watermarking (WM) capabilities, as described below. In the pictured embodiment, device 26 has the form of a television set-top box (STB), which decodes the video content in order to output a series of video image frames to a television monitor 28. Alternatively, video playback devices 26 may comprise any suitable sort of video decoder and may be implemented either as freestanding units, as shown in the figure, or in the form of embedded processing circuitry within a display device, such as a computer, entertainment console, or mobile media player.

Video playback devices 26 in system 20 generally output standard video signals, which may be input to any sort of standard display device (such as monitors 28) or to a video recorder. Once the content has been recorded in this manner, it may be difficult or impossible, despite legal constraints, to prevent subscribers from distributing copies of the content. To enable this sort of unauthorized copying to be tracked, playback devices 26 are programmed to add a watermark to the series of standard video frames that they output. The method of watermarking may be chosen, as described below, so that the watermark is visually imperceptible to the subscribers but can be identified subsequently by spectral analysis.

In an alternative embodiment, the watermark is applied, in the manner described below, at head-end 22. This approach imposes a greater burden on the head-end and may be less precise in identifying the source of an unauthorized copy, but reduces the level of processing capability that is required of playback devices 26.

Figure 2:
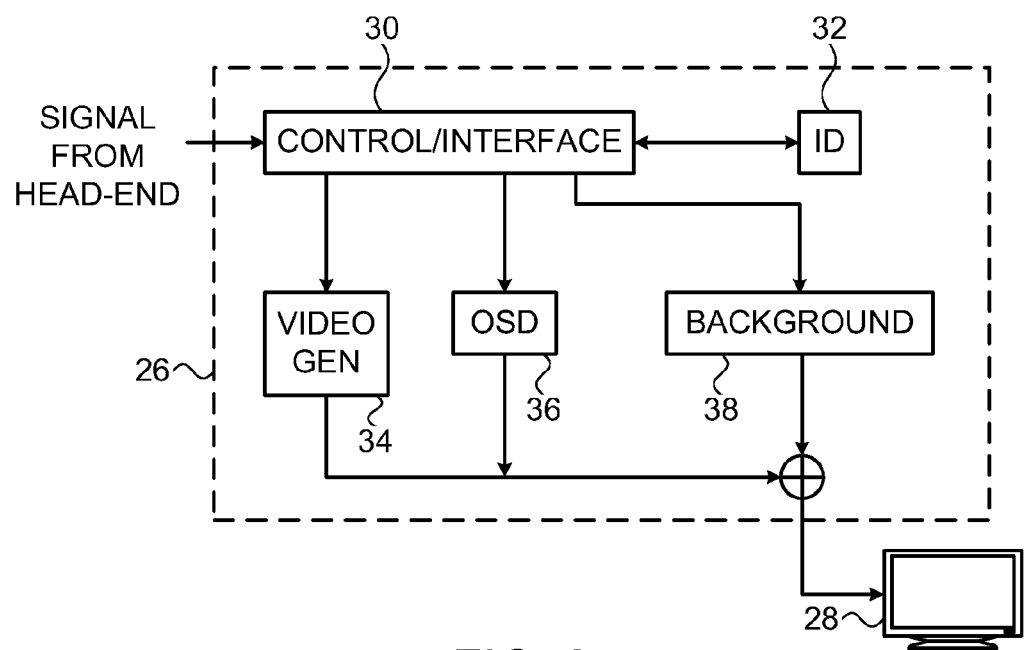
FIG. 2 is a block diagram that schematically illustrates a video playback device, in accordance with an embodiment of the present invention.

FIG. 2 is a block diagram that schematically shows details of video playback device 26, in accordance with an embodiment of the present invention. Device 26 has an identification number stored in a memory 32, which is typically programmed in advance by the manufacturer or network operator. Memory 32 may be built into device 26 or it may be contained on a removable card. In either case, the identifier in memory 32 is typically uniquely identified with the subscriber to whom device 26 is assigned.

Device 26 comprises processing circuitry, including a network interface and controller 30, which receives signals from head-end 22. These signals typically include both encoded video and control commands. Controller 30 passes the encoded video to a video generator circuit 34, which decodes the encoded video and generates a series of standard video frames for output to monitor 28. Controller 30 may also activate an on-screen display circuit 36, to generate menus and other text, and a background circuit 38. The outputs of circuits 34, 36 and 38 are overlaid on one another so that the video frames output to monitor 28 are an integral combination of all three.

In a typical set-top box, the background generated by circuit 38 is blue or black, and its intensity (which is typically expressed in terms of "transparency") is set to 0% when actual video content is being displayed. In practice, however, many set-top boxes (and other display devices) can set the background to any desired color and intensity, and can create a background that varies over the area of the image that is to be displayed. Controller 30 can be programmed in firmware (or other software) to modulate the background color as described below, and to commence and/or terminate the modulation in response to commands from head-end 22. Alternatively or additionally, a suitable image, with modulated chrominance components, may be downloaded from head-end 22 to device 26, and then applied by device 26 to the output video frames at the desired transparency level as a background or other full-screen graphic overlay. More generally, although it is practically convenient to apply the color modulation using the background generation function of the set-top box, the term "background modulation" as used in the present patent application and in the claims should be understood broadly to refer to any sort of image overlay that can produce the sort of modulated patterns that are described herein.

Embodiments of the present invention take advantage of these capabilities of controller 30 and background circuit 38 to embed a watermark in the video frames that are output by device 26. During watermarking, circuit 38 increases the background intensity by a small percentage (typically on the order of 1-2% of the full intensity scale of the monitor) and modulates the color of the background with one or more spatial frequencies that encode an identification code (such as the number stored in memory 32). Device 26 sums this background with the decoded video content. The modulation causes subtle, periodic color variations in the video frames and in the video images presented on monitor 28. These changes are imperceptible to even a skilled and sensitive human viewer, but they can be detected by suitable automated equipment, comprising a suitable combination of hardware and software, as shown below in FIG. 4.

To generate the background modulation, the background level may be defined in a color space that comprises separate luminance and chrominance coordinates. Color spaces that may be used for this purpose include, for example, the well-known YUV and YIQ coordinate systems. In these systems, Y is a single coordinate representing the luminance, while U and V or I and Q are a pair of coordinates representing the chrominance along orthogonal axes. Although modulation of the luminance could be used as part of the watermarking procedure, the inventor has found that modulating only the color coordinates is useful in terms of hiding the watermark from human viewers, as well as facilitating automated detection.

As another alternative, the color axes may be rotated 45° from the IQ frame for the purpose of inserting the watermark. The use of this rotated coordinate system (referred to as YDZ) is advantageous because the axes and scale of the IQ coordinates were chosen to have maximal effect on human visual perception for high and low frequencies, respectively. When the watermark is inserted in the rotated DZ coordinates, the visual effect of the watermark is diminished, since the rotation reduces the intensity of the watermark in each of I and Q, after converting back to IQ coordinates, by a factor of $1/\sqrt{2}$.

To generate the background modulation pattern, controller 30 computes a string of bits based on the identification number that is stored in memory 32. For example, the string may be created by concatenating the identification number with the current date and time to create an input word. The controller may compute an error correction code (ECC) over the input word, thus creating a codeword to serve as the complete string. The controller converts the bits of the codeword into symbols, which determine the watermark modulation pattern.

The components of the processing circuitry in device 26 that are illustrated in FIG. 2—including controller 30, video generator circuit 34, on-screen display circuit 36, and background circuit 38—are shown as separate functional components for the sake of conceptual clarity. In practice, some or all of these functions may be combined in a single physical component or, alternatively, implemented using multiple physical components. These physical components may comprise hard-wired or programmable devices, or a combination of the two. In some embodiments, at least some of the functions of the processing circuitry may be carried out by a programmable processor under the control of suitable software. This software may be downloaded to device 26 in electronic form, over a network, for example. Alternatively or additionally, the software may be stored in tangible, non-transitory computer-readable storage media, such as optical, magnetic, or electronic memory.

Figure 3:
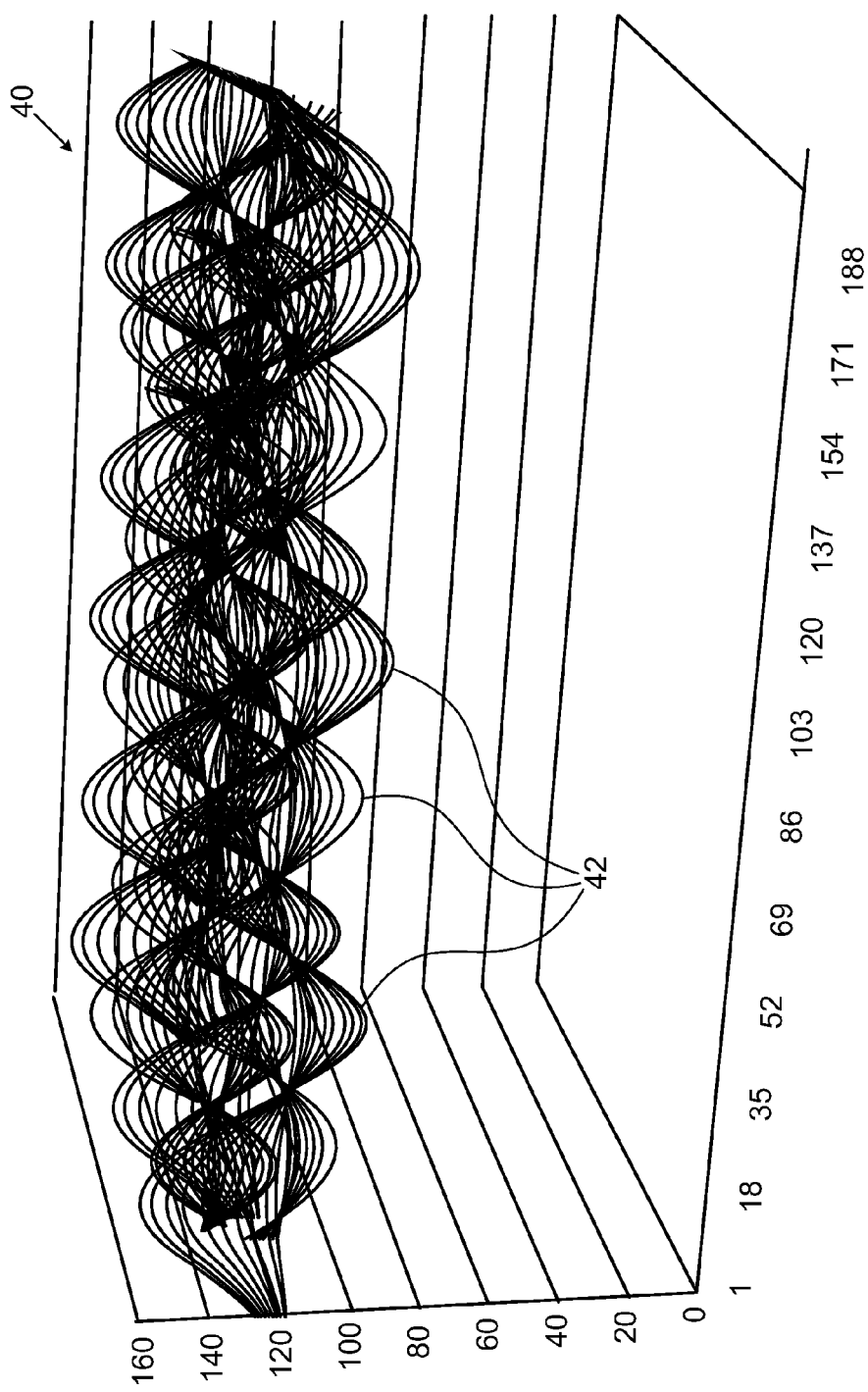
FIG. 3 is a plot showing an image watermarking pattern, in accordance with an embodiment of the present invention.

FIG. 3 is a plot showing an image watermarking pattern 40, in accordance with an embodiment of the present invention. This plot represents one of the two chrominance components in the watermark (for example, the U component). Typically the other chrominance component is modulated with a similar sort pattern, but at different spatial frequencies. The vertical axis in the figure represents the chrominance value (which is modulated about the average level of 127), while the horizontal axes represent width and height (X and Y) position coordinates across the area of the image, which are typically measured in pixels. Sinusoidal modulation in X and Y results in a pattern of rounded peaks 42 that repeat over the image area.

The modulation scheme that is shown in FIG. 3 may be represented mathematically by the U and V chrominance coordinate values:

$$U(x,y) = M + A_u \sin(u_x x + \phi_{ux})\sin(u_y y + \phi_{uy})$$

$$V(x,y) = M + A_v \sin(v_x x + \phi_{vx})\sin(v_y y + \phi_{vy})$$

Here $M=127$; $A_u$ and $A_v$ are the modulation amplitudes (small constant values); $\phi_{ij}$ are random phase constants; and $u_x$, $u_y$, $v_x$, and $v_y$ are the respective spatial frequencies of modulation of the two chrominance components along the X and Y axes. These frequencies are used to encode the identification code.

In one embodiment, the identification codeword is encoded by the quartet of the frequencies themselves $\{u_x, u_y, v_x, v_y\}$. Each of the frequencies, in other words, is a symbol, which is chosen from an alphabet containing a certain number of possible frequencies, for example, thirty-two different values, which may conveniently be expressed in units of pixels$^{-1}$. Thus, in this example, each of the four frequencies encodes five bits, and the concatenation of $\{u_x, u_y, v_x, v_y\}$ represents a codeword of twenty bits. Alternatively, other symbol alphabets may be chosen, representing greater or smaller numbers of bits per symbol. Further alternatively, only a subset of the quartet of frequencies may be used in modulating the image background, and the other frequencies may be set to zero or some other arbitrary value.

In another embodiment, the identification codeword is encoded using a pair of log ratios $\{R_x, R_y\}$, given by:

$$R_x = \log_2\left(\frac{u_x}{v_x}\right),$$

$$R_y = \log_2\left(\frac{u_y}{v_y}\right).$$

(The use of the log ratios simplifies computation of the frequency values that are used to generate $R_x$ and $R_y$, but alternatively simple arithmetic ratios or other sorts of ratio relations may be used.) The values of $R_x$ and $R_y$ are taken to be in the range $\{-T,T\}$, with step $\tau$ between permitted values, such that $T/\tau \geq 2^k$ for a chosen integer k. Each of $R_x$ and $R_y$ can thus represent k+1 bits, and the codeword is formed by concatenation of $R_x$ and $R_y$. This sort of ratio-based encoding may be limited, relative to the preceding embodiment, in the length of the codeword that it can represent; but it is advantageous in that it is insensitive to changes in the aspect ratio of the image, (for example, applying different scaling to the vertical and horizontal dimensions of the image), since the ratios $$\left(\frac{u_x}{v_x}\right) \text{ and } \left(\frac{u_y}{v_y}\right)$$

are invariant under such scaling.

To generate the background modulation in this latter embodiment, the codeword is separated into two sub-strings, each of length k+1 bits. Of the bits in each sub-string, k bits correspond to a given number n, and one bit is the sign s (±). On this basis, the values of $R_x$ and $R_y$ are each given by the corresponding sub-string as $$2^{sn} \cdot \frac{\tau}{T}.$$

The values of the modulation frequencies $\{u_x, u_y, v_x, v_y\}$ are chosen within a predefined range so as to satisfy $$R_x = \log_2\left(\frac{u_x}{v_x}\right),$$

$$R_y = \log_2\left(\frac{u_y}{v_y}\right).$$

Figure 4:
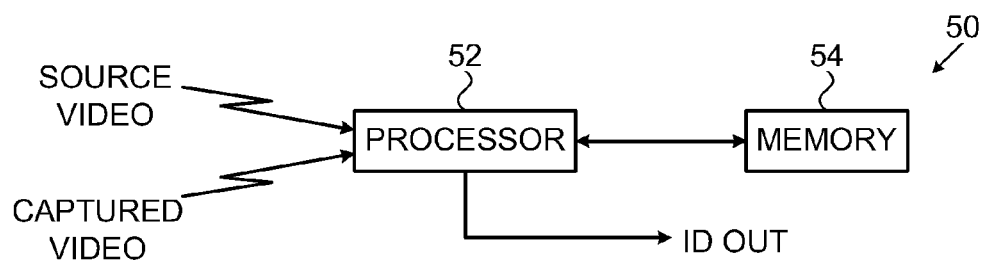
FIG. 4 is a block diagram that schematically illustrates a video watermark reader, in accordance with an embodiment of the present invention.

FIG. 4 is a block diagram that schematically illustrates an automated video watermark reader 50, in accordance with an embodiment of the present invention. Reader 50 comprises a processor 52, which is typically a general-purpose computer processor and is programmed in software to carry out these watermark reading functions. This software may be downloaded to device 26 in electronic form, over a network, for example. Alternatively or additionally, the software may be stored in tangible, non-transitory computer-readable storage media, such as optical, magnetic, or electronic memory media. Processor 52 reads in video content that has been captured from an unauthorized source. The content may comprise a single image or a sequence of images. For example, this video content may have been downloaded from a file sharing Web site. Interim results during the watermark reading and decoding process may be stored in a memory 54.

Optionally, processor 52 also reads in an original source recording of the image or image sequence that is to be analyzed in the captured content. In this case, the processor compares the image versions, typically by aligning the captured and source video inputs and then scaling and normalizing the captured images to match the source. The processor may then compute a difference between the captured and source images and may measure the color of the difference remaining after subtraction. This sort of scaling and subtraction is useful particularly when the first encoding scheme described above is used, in which the codeword is represented directly by the concatenation of $\{u_x, u_y, v_x, v_y\}$. It may not be necessary when the second, ratio-based encoding scheme is used.

Additionally or alternatively, in processing a sequence of images to which a watermark has been applied, processor 52 may sum multiple images. This summation will amplify the constant (watermark) component of the images while averaging out changing image features, and will thus generally enhance the detectability of the watermark.

Processor 52 applies two-dimensional spectral analysis to each of the chrominance components of the captured image (following subtraction and/or summation if applied) in order to find the values of $u_x$, $u_y$, $v_x$, and $v_y$. For example, the processor may apply a Fourier transform to the image in order to identify the vertical and horizontal frequency peaks in each dimension. In the first encoding scheme described above, the codeword is then extracted by concatenating $u_x$, $u_y$, $v_x$, and $v_y$. In the second encoding scheme, the processor computes and then concatenates the ratios $R_x$ and $R_y$ in order to find the codeword. If an error correction code is used in the watermark, it may be used, if necessary, to correct bit errors.

Processor 52 thus extracts and outputs the identification code of the playback device from which the captured video was originally recorded, or the head-end from which it was transmitted, and possibly also the date and time of the recording. As noted above, this watermarking and analysis technique may be applied not only to video sequences, but to substantially any sort of electronic image or image sequence.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for image processing, comprising:
   storing a data string; and
   applying a background modulation to an image, the modulation comprising a periodic spatial pattern of chromatic variations over an area of the image with a constant luminance over the area and with a spatial frequency of the chromatic variations that encodes the data string, wherein:
   the chromatic variations are defined by first and second chrominance components;
   the chromatic variations comprise respective first and second variations of the first and second chrominance components, with different, respective first and second spatial frequencies, which are used to encode the data string; and the data string is encoded by a ratio of the first and second spatial frequencies.

2. The method according to claim 1, and comprising:
receiving in a video playback device encoded video content for playback; and
decoding the encoded video content in the video playback device while applying the background modulation so as to output a series of video images containing the background modulation.

3. The method according to claim 2, wherein the data string comprises an identification code, which uniquely identifies the video playback device.

4. The method according to claim 2, wherein applying the background modulation comprises generating a background containing the periodic spatial pattern, and summing the background with the decoded video content.

5. Apparatus for image processing, comprising:
a memory, which is configured to store a data string; and
processing circuitry, which is configured to apply a background modulation to an image, the modulation comprising a periodic spatial pattern of chromatic variations over an area of the image with a constant luminance over the area and with a spatial frequency of the chromatic variations that encodes the data string, wherein:

the chromatic variations are defined by first and second chrominance components;
the chromatic variations comprise respective first and second variations of the first and second chrominance components, with different, respective first and second spatial frequencies, which are used to encode the data string; and
the data string is encoded by a ratio of the first and second spatial frequencies.

6. The apparatus according to claim 5, wherein the processing circuitry is configured to receive encoded video content for playback, and to decode the encoded video content while applying the background modulation so as to output a series of video images containing the background modulation.

7. The apparatus according to claim 6, wherein the data string comprises an identification code, which uniquely identifies the apparatus.

8. The apparatus according to claim 6, wherein the processing circuitry is configured to generate a background containing the periodic spatial pattern, and to sum the background with the decoded video content.

* * * * *